UNITED STATES PATENT OFFICE.

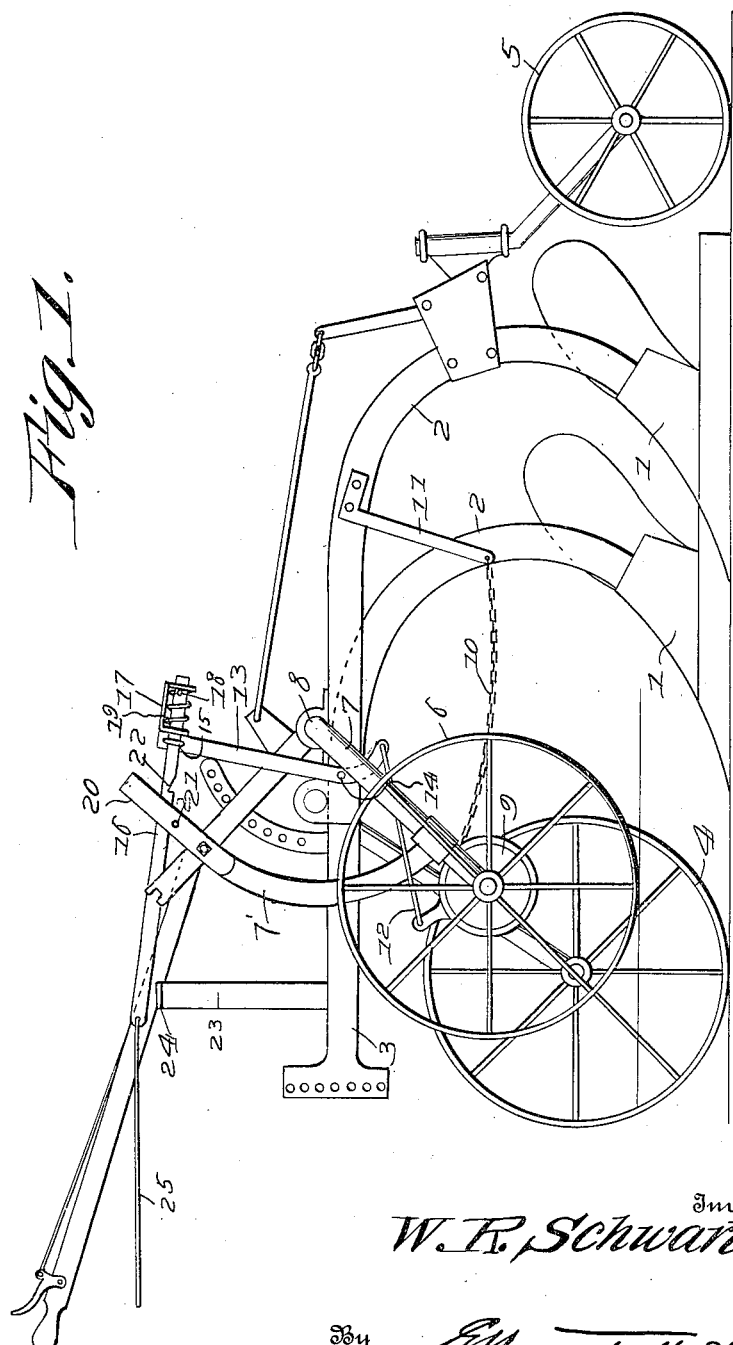

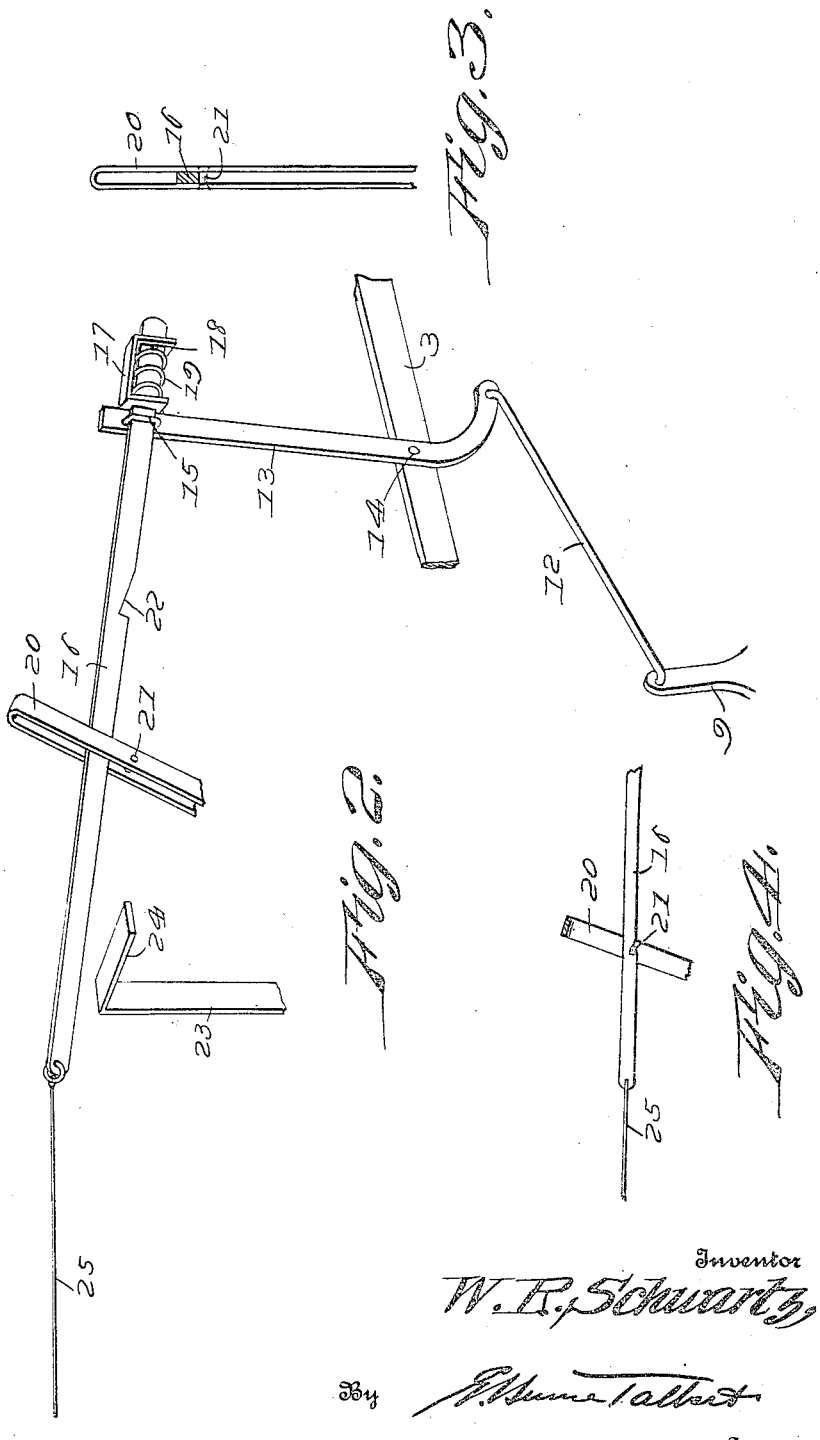

WILLIAM R. SCHWARTZ, OF INDEPENDENCE, NORTH DAKOTA.

PLOW ATTACHMENT.

1,374,033.     Specification of Letters Patent.     Patented Apr. 5, 1921.

Application filed March 21, 1919. Serial No. 283,949.

*To all whom it may concern:*

Be it known that I, WILLIAM R. SCHWARTZ, a citizen of the United States of America, residing at Independence, in the county of La Moure and State of North Dakota, have invented new and useful Improvements in Plow Attachments, of which the following is a specification.

The purpose of the invention is to provide a new and improved form of control lift for sulky plows. The invention is designed for use particularly with the present Moline single and gang sulky plows and seeks to obviate disadvantages at present existing in operation of the latter.

A further purpose of the invention seeks a provision of a lift control which is simple in construction, durable and effective in operation and inexpensive to manufacture and apply to the plow.

Other and further purposes appear in the following description wherein the invention is set forth in detail.

As shown and described, a specific embodiment of the invention is adhered to, but to this embodiment the invention is not to be restricted. The right is reserved to make such changes or alterations as the actual reduction to practice may suggest, in so far as such changes or alterations are compatible in spirit with the annexed claims.

In the accompanying drawings:

Figure 1 is a view in side elevation of a plow of the character mentioned showing the invention applied thereto.

Fig. 2 is a perspective view of the lift *per se*.

Fig. 3 is a detail view partly in elevation and partly in section showing the lift control lever and its attendant guide.

Fig. 4 is a detail view partly in section and partly in elevation of the structure of Fig. 3, by looking at right angles to the elevation shown in the latter figure.

Referring to the drawings, there is shown a gang plow comprising the plows 1, connected in the usual way to their attendant beams 2, the latter being united with a draft beam 3 to which draft animals are hitched by the connection therewith of appropriate draft gear. As is usual, the plow is equipped with the forward furrow wheel 4, the rear furrow wheel 5 and the landside wheel 6. The two furrow wheels 4 and 5 and the landside wheel 6 are of the conventional form employed with the style of plow concerned and the invention is designed particularly for use in connection with the landside wheel 6, this latter being rotatably mounted at the lower end of an arm 7 swingingly supported in a bearing member 8 mounted on top of the draft beam 3. When the plows 1 are at the desired depth, this arm is positioned so that its lower end is to the forward of that end carried in the bearing 8. The lifting of the plows out of a furrow is effected by swinging the lower end of this arm 7 to the rear and to this end the furrow wheel 6 carries a clutch 9, which is of the friction variety and which when in operative position is designed to wind up the chain 10, one end of which is anchored to an arm 11 carried at the rear end of the draft beam 3. The winding up of the chain 10 obviously will operate to swing the arm 7 so that its lower end is moved to the rear, thus bringing the arm toward the vertical position with the resultant raising of the draft beam and the plows 1 connected therewith.

The clutch 9, of course, operates to wind up the chain only when operatively connected with the landside wheel 6 and this operative connection is effected by means of a link 12, which connects with one of the elements and which also connects with the lower end of a lever 13, fulcrumed as indicated at 14 on an appropriate stud or pin carried by the draft beam 3. The lever 13 stands in an upright position and is adapted for forward or rearward swinging at its upper end, the moving forward of the upper end effecting the operative connection between the clutch 9 and the wheel 6, and the swinging rearward releasing such operative connection.

As the plow is at present constructed, a control cable is attached to the upper end of the lever 13 and when it is desired to raise the plows 1 this cable is pulled forwardly thus causing the clutch 9 to be operated and and the plows raised. The difficulty with this arrangement, however, is that the least slacking of the cable will permit the disengagement of the two clutch elements with the result that if the arm has not reached such a position as it occupies when the plows are entirely out of the ground the chain 10 will be allowed to unwind and the plows swing to their former positions. This is one of the difficulties that this present invention is designed to avoid, and to this end the lever 13 is connected with an eye bolt 15 at its upper end and passing slidably through this eye there is a bar 16, the rear end of the bar extending a specified distance through the eye and receiving on this extended end a spring 19 which stands in surrounding relation to the bar. One end of the spring abuts a pin 18 and the remaining end abuts the inner face of one leg of a U-shaped member 17 through both of whose legs the rear end of the bar slidably passes. The remaining leg of the U-shaped member 17 abuts the pin 18 on that side opposite the point of abutment of the spring 19. It is evident, therefore, that the spring 19 is held in a partly compressed state, this construction at the same time providing for cushioning the upper end of the lever 13, as the latter being brought against its adjacent leg of the U-shaped member may move the said member longitudinally along the bar in a manner to compress the spring 19.

Carried at the upper end of the arcuate bar 7' which is mounted upon the arm 7 to the forward of the lever 13 there is a U-shaped guide 20 which straddles the bar 16 near the center. This U-shaped member 20 is formed with relatively long legs and is attached to the arm 7 in inverted position, being provided with a pin 21 secured in both legs, this pin being below the bar 16 and being engaged by the lower edge of the latter and in certain positions of the bar being engaged in the notch 22 formed in the lower edge of the bar.

Mounted upon the shaft beam 3 and to the forward of the U-shaped member 20 there is a stop or trip member 23 which is in the form of an upstanding bar having a right angular bend 24 at its upper end against which the lower edge of the bar 16 at the forward end may engage.

An operating cable 25 is designed to be led to a tractor and has its one end attached to the forward end of the bar 16 so that the latter may be pulled forwardly to effect the operation of the clutch 9. In such pull on the cable 25, the bar 16 is pulled forwardly, thus moving the upper end of the lever 13 forwardly against the cushioning effect of the spring 19. This forward movement continues until the notch 16 is engaged by the pin 21 and since the movement forward of the upper end of the lever 13 effects the operation of the clutch, the clutch will be held in such operative connection without further tension being applied on the cable 25. The clutch will thereupon begin winding up the chain 10 to swing the arm 7 rearwardly with the resultant raising of the plows and this movement will obviously serve to disconnect the elements of the clutch 9 by the tendency to move the link 12 in the opposite direction from that in which it was originally moved, but the tendency to such movement in the link is avoided by the spring 19, which, being compressed on the forward movement of the bar 16, has stored up enough force to move the upper end of the lever 13 forwardly along the bar and thereby keep the link 12 under tension while the arm 7 is moving rearwardly. When the arm 7 has reached a position where it will retain the plows 1 out of the ground, the lever 13 by its upward movement with the plows with respect to the bar 16 will have elevated the rear end of the latter, thus rocking the forward end of the bar 16 with the pin 21 as a pivot down on the right angular projection 24 of the trip or stop member 23 until finally the pin 21 is disengaged from the notch 22, thus allowing rearward movement of the bar 16 and the upper end of the lever 13 with the resultant disconnection of the elements of the clutch 9 so that further winding of the chain 10 is avoided and the plows remain elevated.

In lowering the plows to the ground and in adjusting the depth of plows a slight pull on the bar 16 will be sufficient. This pull on the bar 16 however should not be strong enough to compress the spring 19. Otherwise the notch 22 will engage on pin 21 and the plows will be raised out of the ground.

The invention comprises solely the bar 16 and its attendant parts and their operative connections with the clutch mechanism for the plows. The latter and the clutch mechanism are of conventional form and their construction has not been entered into here, since their description is not essential to an understanding of the invention. The manner of operation of the bar 16, however, and its associated parts, is believed to be clearly enough set forth in the foregoing description and the accompanying drawings to render further description unnecessary.

The invention having been described, what is claimed as new and useful is:

1. The combination with a plow having means for elevating its ground working elements consisting of a swinging arm, a wheel rotatively mounted at the lower end of the arm and clutch control means operatively connected with the wheel for shifting the arm rearwardly, of a lever pivotally mounted on the plow and operatively connected with said clutch controlled means, a bar operatively connected with the lever at one end to provide for the operation of the lever upon longitudinal movement of the bar, a lock engaging the bar when the lever is in operative position, and a trip for the bar to release the same from the lock and thus render the clutch controlled means inoperative after the arm has moved through a prescribed distance.

2. The combination with a plow having means for elevating its ground working element consisting of a swinging arm, a wheel rotatably mounted in the lower end of the arm and clutch controlled means operatively connected with the wheel for shifting the arm rearwardly, of a lever pivotally mounted on the plow and operatively connected with said clutch controlled means, a bar connected with the lever at the upper end of the latter so that the bar may move longitudinally with reference to such connection, a cushioning device carried on the bar and abutting the end of the lever on one side, a lock for the bar when the latter is drawn forwardly to cause the lever to operate the clutch controlled means.

3. The combination with a plow having means for elevating its ground working element consisting of a swinging arm, a wheel rotatably mounted at the lower end of the arm and clutch controlled means operatively connected with the wheel for shifting the arm rearwardly, of a lever pivotally mounted on the plow and operatively connected with said clutch controlled means, a bar connected with the lever at the upper end of the latter so that the bar may move longitudinally with reference to such connection, a guide for the bar, the said guide being mounted on the plow and having means for locking the bar when moved longitudinally a specified distance in one direction, and a cushioning device carried on the bar and abutting the end of the lever on one side.

4. The combination with a plow having means for elevating its ground working elements consisting of a swinging arm, a wheel rotatably mounted at the lower end of the arm and clutch controlled means operatively connected with the wheel for shifting the arm rearwardly, of a lever pivotally mounted on the plow and operatively connected with said means, a bar connected with said lever at the upper end of the latter so that the bar may move longitudinally with reference to such connection, a guide for the bar, the said guide being mounted on the plow and having means for locking the bar when moved longitudinally a specified distance from one direction, a cushioning device carried on the bar and abutting the said end of the lever on one side, movement of the bar effecting operation of the clutch controlled means and a trip member carried by the plow and engageable with the bar for the release of the same from said locking means after said clutch controlled means has operated to effect the shifting of the arm a prescribed distance.

5. The combination with a plow having means for elevating its ground working elements consisting of a swinging arm, a wheel rotatably mounted at the lower end of the arm and clutch controlled means operatively connected with the wheel for shifting the arm rearwardly, of a lever pivotally mounted on the plow and operatively connected with said clutch controlled means, a bar connected with said lever at the upper end of the latter so as to move longitudinally with reference to such connection, a spring surrounding the bar, a U shaped member having its legs loosely engaging the bar and straddling the spring and having its one leg abutting the end of the lever, a pin passed transversely through the bar, the spring being compressed between said pin and that leg of the U shaped member abutting the lever, locking means for the bar when moved forwardly for the operation of the lever and with it the clutch controlled means, and a release for the bar after the clutch controlled means, has operated to effect the shifting of the arm a prescribed distance.

In testimony whereof I affix my signature.

WILLIAM R. SCHWARTZ.